May 11, 1954  W. R. VAN HOOK  2,678,369
ARC WELDING EYESHIELD CONTROL
Filed Feb. 26, 1951
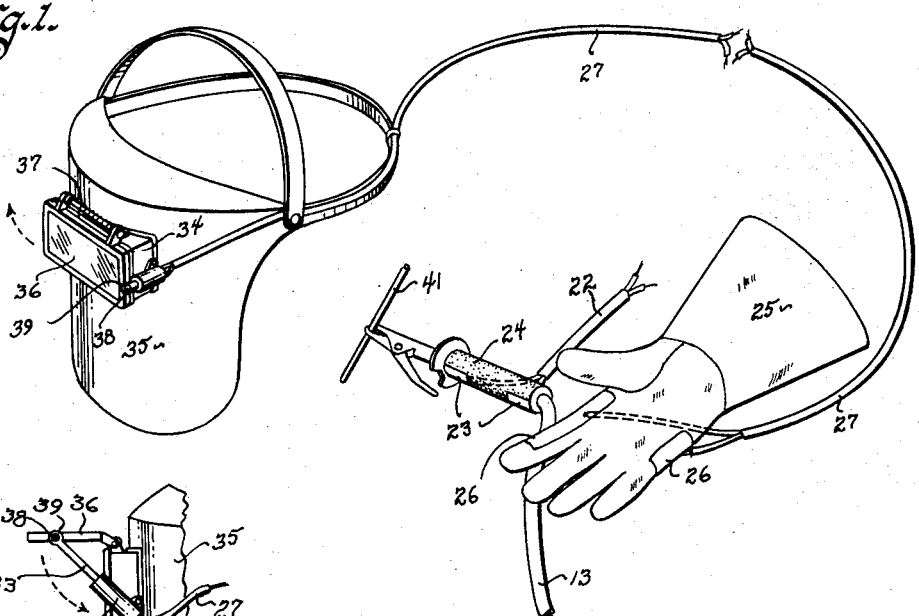
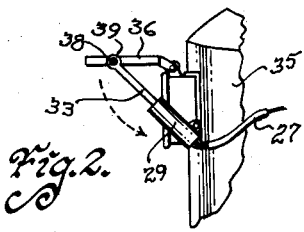
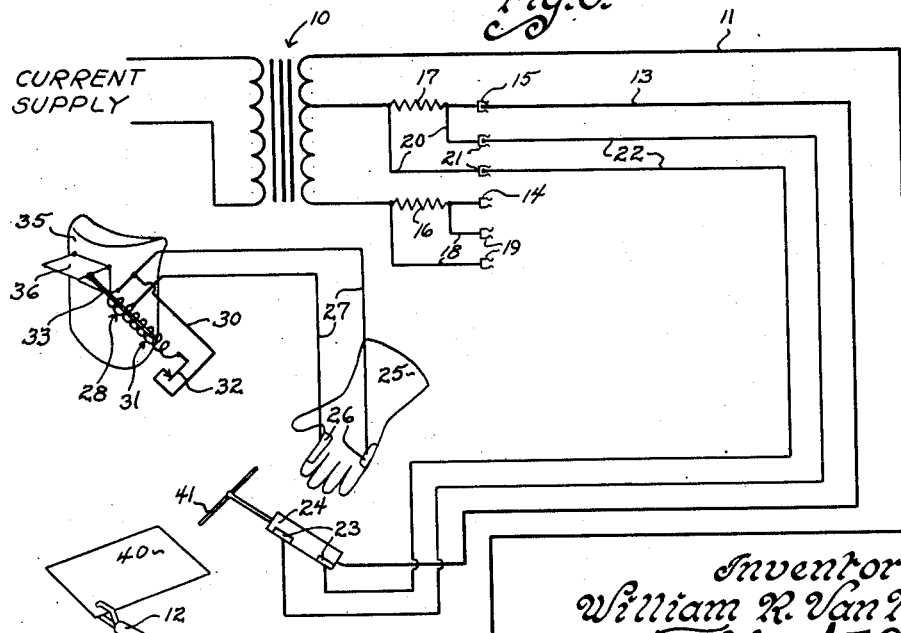
Inventor
William R. Van Hook
by M. Talbert Dick
Attorney
Witness
Edward P. Seeley Patented May 11, 1954

2,678,369

UNITED STATES PATENT OFFICE 2,678,369

ARC WELDING EYESHIELD CONTROL

William R. Van Hook, Maxwell, Iowa

Application February 26, 1951, Serial No. 212,790

3 Claims. (Cl. 219—8)

My invention relates to the art of arc welding. Specifically, I have invented an electrical means for placing the dark glass eye shield in a position to protect the eyes and this electrical means is synchronized electrically with the welding machine to operate automatically whenever current flows in the main welding leads preparatory to striking an arc.

The art of arc welding is well known as is the associated art of shields to protect the eyes of those working with arc welding equipment. These face guards and eye shields normally take the form of a head harness that is fitted to the operator's head and remains stationary throughout the welding operation. The face guard is hingedly secured to this head harness and is usually used as follows. The guard is tipped up during the moments just preceding the striking of the arc. As the glass eye piece is made of a glass so dark that nothing can be seen through it in ordinary light, the shield must be out of the path of vision of the operator during the moments preceding the striking of the arc. As the arc is struck, however, a nodding motion of the head causes the guard to fall in front of the face with the dark glass eye shield positioned in front of the eyes. Once the arc is going sufficient light is produced to permit the operator to observe his welding as he proceeds. The view through this exceedingly dark glass is not clear, however, even with the arc producing a light of extraordinary brilliance. Occasionally, therefore, the operator stops the arc and lifts the mask to view the work as it appears in the normal daylight, or artificial lighting as the case may be. The physical motions necessary to lift the face guard and to return it each time a new arc is struck are relatively slight, but when these steps are repeated often, the total time so lost is considerable.

It is the principal object of my invention, therefore, to provide an arc welding eye shield control that works automatically and requires no extra physical movement by the operator, apart from striking or breaking the arc. It is another object of my invention to provide an arc welding eye shield control that is synchronized with the initial flow of current through the main welding leads just prior to the creation of the arc. It is the still further object of my invention to provide an arc welding eye shield control that requires no skill, attention or ability on the part of the user. It is another object of my invention to provide an arc welding eye shield control that does not interfere with or inhibit the welder using welding equipment provided with my control. It is still a further object of my invention to provide an arc welding eye shield control that is automatically connected to the welding machine whenever the operator grasps the electrode clamp handle. It is a further object of my invention to provide an arc welding eye shield control that is durable in use, simple in construction and inexpensive to manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my arc welding eye shield control and those parts of a welding machine with which it is particularly associated. Portions of the lead lines and the shunt have been omitted to save space. Broken lines illustrate hidden parts of the device and show movement of the eye shield, Fig. 2 is a fragmentary side view of an arc welding face guard with my eye shield and actuating mechanism mounted thereon, Fig. 3 is a mechanically schematic view and electrical wiring diagram of my arc welding eye shield control.

Referring to the drawings, I have used the numeral 10 to designate a variable current arc welding machine of the alternating current type. The numeral 11 designates the fixed ground lead with the ground plate clamp 12 secured to its extremity. A moveable electrode clamp lead is designated 13. The numeral 14 indicates a high current plug-in for the electrode clamp lead 13 while the numeral 15 designates a similar low current connection. In practice, the number of current connections for varying current flows may be considerably greater in number than two, but for illustrative purposes, two are sufficient and therefore only two are shown. The numeral 16 designates a shunt or calibrated resistance in the high current lead while the numeral 17 designates a similar unit in the low current connection. A pair of auxiliary leads designated 18 extend from the shunt 16 to auxiliary plug-in 19 while the numeral 20 designates a similar pair of leads on the shunt 17 to the auxiliary plug-in 21. The leads 18 and 20 are connected to the leads 22 whenever the main welding moveable electrode clamp lead 13 is plugged into the contact connected with the shunts to which these leads are connected. The leads 22 extend to plates 23 on the electrode clamp handle 24. A gauntlet designated 25 is provided with flexible electrical conductors designated 26 which are spaced to register with the plates 23 whenever the electrode clamp handle is grasped by the hand wearing the gauntlet 25. From the flexible conductors 26, leads 27 extend to a solenoid holding coil designated 28. Within the solenoid housing designated 29, a jumper lead designated 30 connects the main actuating coil 31 into the circuit through the breaker points 32. The solenoid coil is provided with a sliding core designated 33. The solenoid housing 29 is secured to the eye shield frame 34 of the welding face guard 35. The dark glass eye shield window 36 is hingedly secured to the face guard eye shield frame 34. A spring designated 37 holds the glass eye shield 36 in the position illustrated in Fig. 2. The outer end of sliding core 33 is rotatably secured to the dark glass eye shield 36 by any suitable means such as the pin 38 extending through the eye 39 in the end of sliding core 33. In preparation for welding, of course, the clamp ground plate 12 is secured to the welding work 40 and an electrode designated 41 is grasped by the electrode clamp handle. The structural details of the device have now been described adequately to permit a description of the operation of my device.

To use my device, the welder selects the correct current flow plug-in for the work he intends to do and as he connects the main welding lead to the electrode clamp handle, he automatically connects the auxiliary leads to the plates on the clamp handle across the shunt. For example, if a low current were selected for the particular work, the electrical hook-up of the main welding and auxiliary leads to the machine would be as pictured in Fig. 3. With the power applied to the welding machine, a voltage differential will be created between the electrode and the work to be welded. The operator grasps the electrode clamp handle with his gauntlet and places the face guard 35 on his head. Since no current is flowing in the system at this point, the solenoid coils will not be energized an spring 37 will, therefore, hold the dark glass eye shield in a position such as that illustrated in Fig. 2. The operator then has his clear view of the work as he strikes his arc. As soon as the electrode comes into contact with the work, however, a current does flow through the main welding leads and therefore through the shunt 17 in our present example. The shunt 17 is calibrated to produce a particular voltage drop for the current that will flow through the shunt during normal welding operation. In the instant that the electrode contacts the work before the arc is drawn, however, there will be a greater surge of current through the system than during normal welding. During this surge period, a relatively high voltage drop will be caused in the shunt. Since the solenoid coils 28 and 31 are connected in parallel to the shunt, there will be, of course, a current flow through these coils in an effort to equalize the difference in potential between the ends of the shunt. Instantaneously, of course, with the energizing of the solenoid coils, the sliding core 33 is drawn into the solenoid housing as shown in Fig. 1. A fraction of a second therefore, before the arc is actually drawn, the dark glass eye shield is pulled into place. To insure a light excluding fit around the edge of the moveable eye shield, it may be provided with a resilient gasket of rubber or the like, but it is not deemed essential. As sliding core 33 reaches its full limit of travel, it mechanically opens the breaker points 32. Therefore, the coil 31, which is the main actuating coil, has its circuit broken. Only the holding coil 28 remains in the circuit, therefore, which prevents any considerable amount of steady current flow and also reduces heating of the solenoid unit. This operation of the solenoid is not new to me, however, and I do not claim this structure as an invention of mine, apart from its relation to the rest of my device. Furthermore, it is not essential that this type of solenoid coil would necessarily be used and it is shown primarily as one means of reducing the amount of current flow through the solenoid after the sliding core has reached its limit of travel. Obviously, as long as current continues to flow in the main current leads, current will also flow through the solenoid holding core 28. The shunt, in this case 17, is calibrated to produce the appropriate amount of current flow through solenoid coil 28 during normal welding operations with the main welding lead connected as shown in Fig. 3. When a higher welding current is used, the electrode clamp lead is inserted in the high current plug-in 14 and the resistance of shunt 16 is sufficiently less than the resistance of shunt 17 in the low current line to cause the same amount of current to flow through holding coil 28 when it is connected across shunt 16 as when it is connected across the low current shunt 17. Whenever the arc is broken by the operator to observe the work in light exclusive of that provided by the arc, current ceases to flow in the main welding leads and also immediately through holding coil 28. As soon as current ceases to flow through the holding coil, spring 37 returns the dark glass eye shield 36 to the position shown in Fig. 2, and the operator is free to observe the work. As the sliding core 33 is returned to the position shown in Fig. 2 and also in Fig. 3, the breaker points 32 return to the closed position as shown in Fig. 3. Thus the main actuating coil is again connected into the circuit and the device is ready to operate again as soon as the operator strikes an arc.

Although I have only shown the one form of welding machine, the principle here disclosed and described could be readily adapted to any arc welding machine by a competent electrical mechanic having my specification and drawings before him. If a smaller solenoid coil were to be used, the glass eye shield 36 could be divided into two smaller units, one of which is fixed, and leaving only half as large a portion to be actuated by the solenoid. I am also aware that a solenoid unit could be provided having only a single coil which would depend for its initial actuating power on the surge of current which flows through the system when the electrode first contacts the work. The amount of current flowing through the coil to hold the eye shield in place would be considerably less than this initial current flow once the arc is formed. The arc provides considerable resistance in the circuit which reduces the amount of current flow through the shunt to a relatively small amount which would in turn reduce the current flow through the solenoid coil. Similarly, it is possible that a single shunt might be used that would result in considerable variation in the amount of voltage applied to the solenoid coil, but which would not be an excessively great range if a double coil unit, such as that diagrammed in Fig. 3, were employed. These are variations of my basic idea, which I believe fall within the scope of my invention.

Some changes may be made in the construction and arrangement of my arc welding eye shield control and method of making same without departing from the real spirit and purpose of my invention, and it is my intention to cover by my claims, any modified forms of structure or use of mechanical equivalents which may be reasonably included within their scope.

I claim:

1. In combination with an arc welding machine having a ground plate and lead and an electrode clamp handle and lead, a shunt connected in the electrode clamp handle lead, a pair of insulated spaced apart plates on the electrode clamp handle, a secondary lead extending from one of said plates to one end of said shunt, another secondary lead extending from the other plate to the other end of said shunt, a face guard having a moveable dark glass eye shield thereon, a solenoid secured to said face guard, a sliding core in said solenoid mechanically connected to said moveable dark glass eye shield; said solenoid coil having its ends connected to solenoid leads, a welding gauntlet, and plates on said gauntlet that register with the plates on said electrode clamp handle whenever said clamp handle is gripped by a hand in said gauntlet; said solenoid leads having their free ends each connected to separate ones of said plates on said gauntlet respectively.

2. In combination with a variable current arc welding machine having two main welding current leads, a face guard having a moveable dark glass eye shield thereon, a shunt in one of the leads of said variable current arc welding machine; a means for varying the resistance of said shunt to produce substantially a fixed voltage drop regardless of the operating current of said variable current arc welding machine, a face guard having a moveable dark glass eye shield thereon, a means for converting electrical energy into mechanical movement mounted on said face guard and mechanically linked to the moveable dark glass eye shield of said face guard, a welding gauntlet of a dielectric material, spaced apart electrical conductors on said gauntlet, leads extending from said means for converting electrical energy into mechanical movement to said electrical conductors, spaced apart conductor plate on the one of said main welding leads that is held by the operator; said conductor plates constructed and arranged to register with said electrical conductors when an operator wearing said gauntlet grips said main welding lead that is held by the operator; and leads extending from said conductor plates to the respective ends of said shunt.

3. In a device for electrically connecting an auxiliary electrical machine to a main electrical machine when said auxiliary electrical machine is worn by the operator of the machine and a portion of the main machine is consistently grasped by the operator in a fixed pattern during operation of said main machine, a gauntlet, a pair of insulated spaced apart plates secured to said gauntlet; flexible electrical conductors secured to said plates on said gauntlet, a pair of plates secured to the portion of said main machine that is consistently grasped by the operator during operation of said main machine; said plates on said gauntlet registering with said plates on the grasped portion of said main electrical machine when said main machine is grasped by an operator's hand wearing said gauntlet, and electrical conductors secured to said plates and connected to the circuit of said main machine; said flexible electrical conductors secured to said plates on said gauntlet being secured to said auxiliary electrical circuit.

References Cited in the file of this patent

UNITED STATES PATENTS

| Number | Name | Date |
|---|---|---|
| 1,497,012 | Goodspeed | June 10, 1924 |
| 1,822,308 | Norton | Sept. 8, 1931 |
| 2,171,052 | Tatter | Aug. 29, 1939 |
| 2,471,719 | Broffitt et al. | May 31, 1949 |
| 2,514,990 | Dewan | July 11, 1950 |
| 2,548,230 | Molyneux | Apr. 10, 1951 |
| 2,582,860 | Clerke | Jan. 15, 1952 |

FOREIGN PATENTS

| Number | Country | Date |
|---|---|---|
| 224,784 | Switzerland | Apr. 16, 1943 |
| 325,586 | Great Britain | Feb. 24, 1930 |